Nov. 5, 1940.    C. L. GRESS    2,220,646
DIRECTION SIGNAL
Filed May 15, 1939
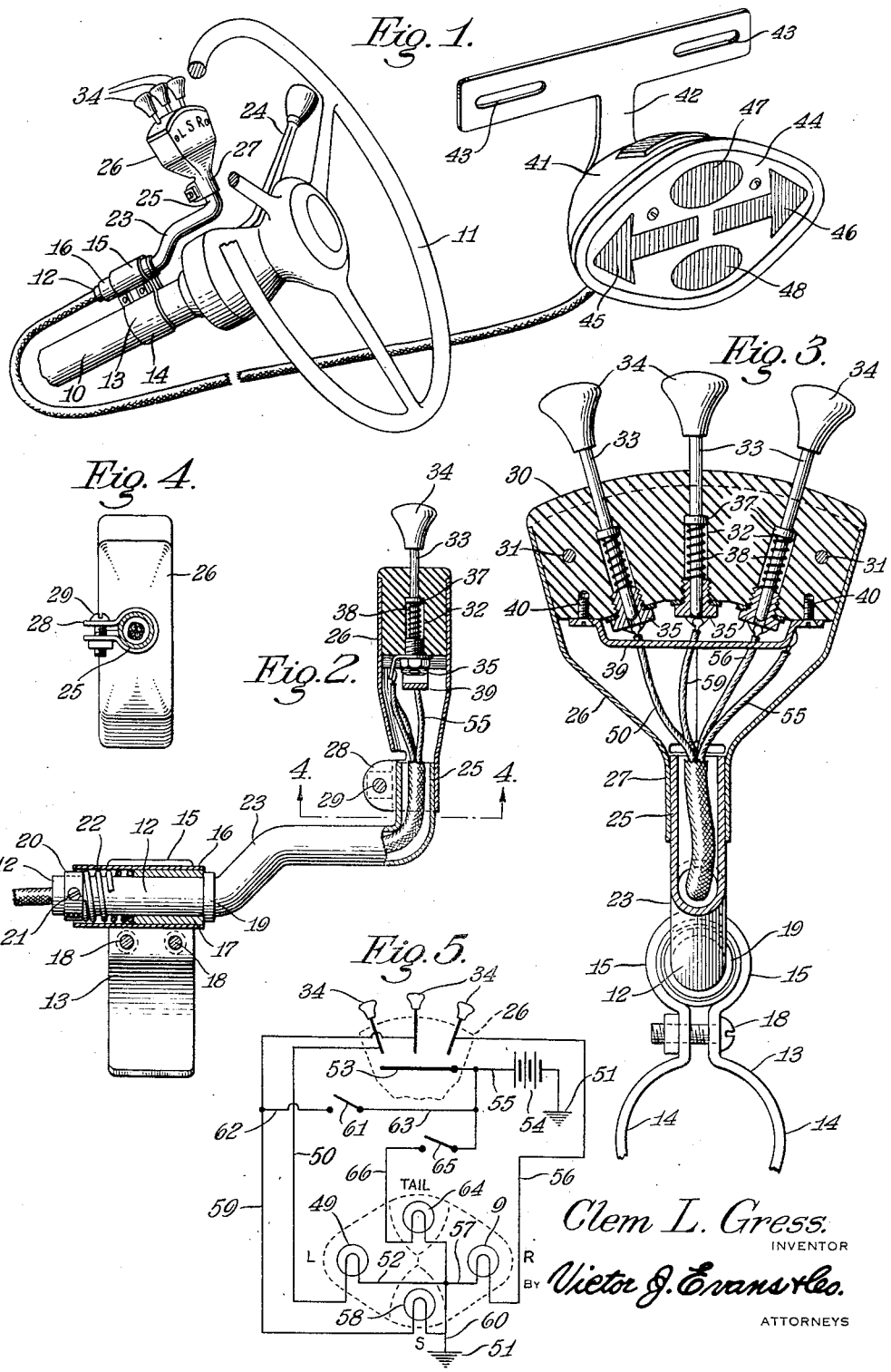
Clem L. Gress.
INVENTOR
BY Victor J. Evans & Co.
ATTORNEYS Patented Nov. 5, 1940

2,220,646

UNITED STATES PATENT OFFICE 2,220,646

DIRECTION SIGNAL

Clem L. Gress, Marshall, Mo.

Application May 15, 1939, Serial No. 273,793

1 Claim. (Cl. 200—59)

This invention relates to direction signals and has for an object to provide switch apparatus which may be attached to the steering column through the medium of a novel bearing and clamp which will permit the operating buttons being disposed near the rim of the steering wheel and to be movable with the steering wheel so that the operator may depress a selected button and hold it depressed without removing his hands from the steering wheel during a change of direction or while traveling straight ahead.

A further object is to provide switch apparatus of this type which will be formed of a few strong simple and durable parts which will be inexpensive to manufacture and install and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a perspective view of turn signal apparatus constructed in accordance with the invention.

Figure 2 is a longitudinal section view of the signal switch with parts in elevation.

Figure 3 is a cross sectional view of the switch with parts in elevation.

Figure 4 is a cross sectional view of the switch taken on the line 4—4 of Figure 2 looking in the direction of the arrows.

Figure 5 is a diagrammatic view of the electrical connections of the signal.

Referring now to the drawing in which like characters of reference designate similar parts in the various views, 10 designates a steering column and 11 a steering wheel, these parts being conventional. In carrying out the invention, the switch mechanism is applied to the steering column and comprises a tubular bracket arm 12 which is secured to the steering column through the medium of a two-piece clamp 13 having jaws 14 adapted to embrace opposite sides of the column and having jaws 15 adapted to receive a bearing sleeve 16, shown best in Figure 2, in which is mounted a bushing 17 which loosely receives the lower end of the arm 12. Bolts 18 secure the two members of the clamp together between the jaws.

The arm is provided with a collar 19 integral therewith and also is provided with a collar 20 which is secured thereto through the medium of a set screw 21. A helical spring 22 is sleeved on the arm between the bushing 17 and the collar 20 and bears against both these parts to hold the fixed collar 19 frictionally engaged with the end of the bushing so that the arm may be rotated axially but will be restricted by the friction from turning too freely in the bushing.

The arm is provided with an offset 23 which permits the arm to pass over the change gear lever 24 when the latter is attached to the steering column, during axial rotation of the arm in the bearing sleeve 16. The upper end of the arm is directed radially from the steering column as shown at 25.

The switch casing 26 is provided at the lower end with a nipple 27 which receives the laterally directed end 25 of the arm, as shown in Figure 2. The nipple is split and provided with ears 28 through which a draw bolt 29 is passed to draw the nipple tightly on the end of the arm.

A block of insulation 30 is secured in the upper end of the switch casing through the medium of bolts 31 and is provided with three recesses 32 to receive the stems 33 of three push buttons 34. The push buttons extend radially in the block of insulation and are disposed within convenient reach of the driver's hands when he is steering the vehicle so that he may push a selected button without removing his hands from the steering wheel and hold the button depressed while making a turn, since the arm 12 will turn axially in the bearing sleeve 16. Although the arm is not rotatable about the same axis as the steering wheel, yet the operator will not be inconvenienced, since he need only loosen his fingers slightly to follow the movement of the switch.

The push buttons are slidably mounted in respective nipple nuts 35 which form binding posts to receive respective circuit wires. Each nipple nut is threadedly engaged in the lower side of the block of insulation, and between the nipple nut and a collar 37 on the respective push button stem, a helical spring 38 is sleeved. This spring returns the push button to normal position when the driver releases the button.

A stationary switch contact 39, in the nature of a metal bar, is secured at the ends to the bottom face of the block of insulation through the medium of screws 40. The bar is located directly below the push buttons so that when any selected push button is depressed, it will engage the bar and form a circuit closer to a respective signal bulb.

A signal lamp 41 is provided with a T-shaped bracket 42 having slots 43 in the lateral branches to receive the conventional securing bolts on the license hanger of the vehicle, not shown. The casing is provided with a pane 44 bearing a distinctly colored arrow 45 pointed to the left, and a distinctly colored arrow 46 pointing to the right. Above and below the arrow at the center of the pane are located distinctly colored ovals 47 and 48. Signal bulbs back of these insignia and arranged in respective compartments shine through respective insignia to illuminate an intended turn when a respective push button is operated.

As shown in Figure 5, the signal bulb 49 back of the left arrow is connected by a circuit wire 50 to the left push button 34, and is connected to a common ground 51 through the medium of a wire 52. The stationary switch contact 39 is connected to the source of power 54 by a wire 55. Thus when the left push button is actuated, the left turn indicating signal arrow 45 will be illuminated.

The signal bulb 9 back of the right turn indicating arrow 46 is connected by a wire 56 to the right push button 34 and is connected by a wire 57 to the common ground. Thus when the right push button is depressed, the right turn indicating signal arrow will be illuminated. The signal bulb 58 back of the lower central oval 48 is connected by a wire 59 to the centermost push button 34 and connected by a wire 60 to the common ground. This push button corresponds to the stop signal and when it is depressed the stop signal oval 48 will be illuminated. The stop signal oval may also be independently illuminated by depressing the conventional brake operated switch 61 which is connected to the wire 59 by a wire 62 and which is connected to the source of power by a wire 63.

The bulb 64 back of the upper oval 47 corresponds to the conventional taillight bulb and is connected to the conventional light switch 65 by a wire 66, the light switch being connected to the source of power by a wire 67.

In operation, the driver depresses a selected push button corresponding to an intended turn in sufficient time before he makes the turn to warn traffic of his intentions. He may, if he wishes, hold the button depressed while a change of direction is being made and until the vehicle straightens out in its new course, since the switch casing follows movement of the steering wheel due to the operator's hand being grasped upon the steering wheel while depressing the button and due to the switch casing being swingable by the arm 12 turning in its bearing sleeve 16.

From the above description it is though that the construction and operation of the invention will be fully understood without further explanation.

What is claimed is:

The combination with a steering wheel and a steering column, of a bracket arm extending longitudinally of the steering column and extending radially of the steering wheel at the upper end, a switch on the upper end of the arm disposed adjacent the steering wheel rim, a clamp secured to the steering column having jaws, a bearing sleeve between the jaws, a bushing in the bearing sleeve loosely receiving the lower end of the arm, said arm turning axially in the bushing when the driver holds the switch in circuit closing position with the fingers of the hand used to turn the steering wheel in making a turn, spaced collars on the arm outside of the ends of the bushing, and a helical spring in the bearing sleeve disposed on the arm between the bushing and one of the collars yieldably holding the other collar frictionally engaged against the adjacent end of the bushing to prevent too free axial turning movement of the arm in the bushing.

CLEM L. GRESS.